(12) United States Patent
Sharma et al.

(10) Patent No.: US 11,395,355 B2
(45) Date of Patent: *Jul. 19, 2022

(54) TELECOMMUNICATIONS APPARATUS AND METHODS

(71) Applicant: Sony Corporation, Tokyo (JP)

(72) Inventors: Vivek Sharma, Basingstoke (GB); Brian Alexander Martin, Basingstoke (GB); Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,439

(22) Filed: Nov. 30, 2020

(65) Prior Publication Data

US 2021/0084696 A1 Mar. 18, 2021

Related U.S. Application Data

(63) Continuation of application No. 16/818,373, filed on Mar. 13, 2020, now Pat. No. 10,856,342, which is a
(Continued)

(30) Foreign Application Priority Data

Sep. 29, 2016 (EP) ..................................... 16191543

(51) Int. Cl.
*H04W 76/10* (2018.01)
*H04W 8/18* (2009.01)
(Continued)

(52) U.S. Cl.
CPC ............. *H04W 76/10* (2018.02); *H04W 8/18* (2013.01); *H04W 8/22* (2013.01); *H04W 76/18* (2018.02); *H04W 24/10* (2013.01); *H04W 28/08* (2013.01)

(58) Field of Classification Search
CPC ....... H04W 76/10; H04W 76/18; H04W 8/18; H04W 8/22; H04W 24/10
(Continued)

(56) References Cited

U.S. PATENT DOCUMENTS 10,595,346 B2   3/2020  Sharma et al.
2004/0106430 A1*  6/2004  Schwarz ............... H04W 28/18
                                                    455/552.1
(Continued)

FOREIGN PATENT DOCUMENTS

EP    2493245 A2   8/2012
EP    2493245 A3   12/2012
(Continued)

OTHER PUBLICATIONS

R2-165582 3GPP TSG-RAN WG2 Meeting #95, Aug. 2016 (Year: 2016).*
(Continued)

*Primary Examiner* — William Nealon
(74) *Attorney, Agent, or Firm* — Xsensus LLP

(57) ABSTRACT

A method for controlling a connection procedure for a terminal device requesting a radio connection to a cell supported by network infrastructure equipment in a wireless telecommunication system, the method comprising: determining, at the terminal device, that a request to connect to the cell supported by the network infrastructure equipment is to be made, establishing, at the terminal device, application information relating to an operating context for the terminal device: transmitting a connection request message
(Continued)

from the terminal device to the network infrastructure equipment, wherein the connection request message comprises a request for the terminal device to connect to the cell and an indication of the application information; and determining, at the network infrastructure equipment, whether to allow the request for the terminal device to connect to the cell based, at least in part, on the application information received by the network infrastructure equipment from the terminal device.

14 Claims, 4 Drawing Sheets

Related U.S. Application Data continuation of application No. 16/334,363, filed as application No. PCT/EP2017/073196 on Sep. 14, 2017, now Pat. No. 10,595,346.

(51) Int. Cl.
    *H04W 28/08*    (2009.01)
    *H04W 24/10*    (2009.01)
    *H04W 76/18*    (2018.01)
    *H04W 8/22*    (2009.01)

(58) Field of Classification Search
    USPC ...................................................... 455/435.1
    See application file for complete search history.

(56) References Cited

U.S. PATENT DOCUMENTS

| | | | |
|---|---|---|---|
| 2015/0016412 A1* | 1/2015 | Horn | H04W 36/24 370/331 |
| 2018/0249513 A1* | 8/2018 | Chang | H04W 72/04 |

FOREIGN PATENT DOCUMENTS

| | | | |
|---|---|---|---|
| SE | WO 2006137779 A1 * | 12/2006 | |
| WO | 2006/137779 A1 | 12/2006 | |

OTHER PUBLICATIONS

3GPP TSG-RAN WG2 Meeting #95 R2-165582 (Year: 2016).
Qualcomm Incorporated, "UE Context awareness to optimize the RAN performance", 3GPP TSG-RAN WG2 Meeting No. 95 R2-165582, Gothenburg, Sweden, Aug. 22-26, 2016, pp. 1-5.
Oliva, "5G: Evolution Towards a Networked Society", UFSCar Presentation, Sep. 28, 2016, 94 pages.
Ericsson, "5G Systems", Ericsson White Paper, Uen 284 23-3244, Jan. 2015, pp. 1-14.
Ericsson, "5G Radio Access", Ericsson White Paper, Uen 284 23-3204 REV B, Feb. 2015, pp. 1-10.
Holma et al. , "LTE for UMTS OFDMA and SC-FDMA Based Radio Access", Wiley 2009, System Architecture Based on 3GPP SAE, 11 pages.
International Search Report dated Nov. 29, 2017 for PCT/EP2017/073196 filed on Sep. 14, 2017, 17 pages.

* cited by examiner

TELECOMMUNICATIONS APPARATUS AND METHODS

CROSS-REFERENCE TO RELATED APPLICATIONS

The present application is a continuation of U.S. application Ser. No. 16/818,373, filed Mar. 13, 2020, which is a continuation of U.S. application Ser. No. 16/334,363, filed Mar. 19, 2019, (now U.S. Pat. No. 10,595,346), which is based on PCT filing PCT/EP2017/073196, filed Sep. 14, 2017, which claims priority to EP 16191543.4, filed Sep. 29, 2016, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

For a wireless telecommunications system to efficiently support terminal devices of different types having different capabilities and communicating different types of data, the network infrastructure needs to know the relevant characteristics of the terminal devices' operation—i.e. the characteristics which may impact how communications with the terminal device should be handled to improve efficiency. In this regard the relevant characteristics of a terminal device's operation may be broadly considered to fall into two categories of information.

A first category, which may be referred to herein as capability information, includes information which relates to the fundamental ability of the terminal device to access the radio network, for example in terms of the radio access technologies it supports, its operating bandwidth and frequencies, MIMO support, carrier aggregation support, and so on. Capability information may thus broadly be considered to relate to characteristics of the device which are generally set by hardware and which determine how the terminal device can access the physical layer. The use of such capability information in configuring communications in wireless telecommunications systems is well established.

A second category of information, which may be referred to herein as application information or device context information, includes information which relates to higher-layer operations of the terminal device (i.e. layers higher than the physical later), for example including information relating to software applications the device supports/is currently running, and the nature of the device and how it is being used, for example in terms of whether the device is a static device, a mobile device, a wearable device, and so on. Application information/device context information may thus be considered to include information representing parameters/characteristics that relate to a current mode of operation for a mobile device, its environment and mobility, and other information which is separate from the capability information relating to how the terminal device may physically access the radio interface.

In conventional wireless telecommunications networks, such as LTE-based networks, it is known for capability information relating to a terminal device to be communicated from the terminal device to the network (e.g. in a Radio Resource Control, RRC, message) during an initial registration/context set up process for the terminal device in the network. The capability information is stored in a mobility management entity (MME) in the core network from where it can be provided to base stations as and when required to help the base station optimise the manner in which their communications with the terminal device are configured, for example configuring the terminal device for carrier aggregation if the capability information for the terminal device indicates the terminal device supports carrier aggregation. If a base station is unable to acquire capability from the MME it may ask a terminal device for a capability report containing this information, e.g. by sending an RRC UECapabilityEnquiry message to the terminal device and receiving an RRC CapabilityInformation message in response. To help reduce the amount of data communicated between a terminal device and a base station in relation to the exchange of capability information, recent proposals allow for a base station to in effect request information relating to only some aspects of a terminal device's capability, for example, relating to what frequency bands the terminal device supports and its carrier aggregation and MIMO capabilities, this is instead of requiring a terminal device to report a full set of capability information.

In addition to taking account of capability information for a terminal device (i.e. information relating to how the terminal device can access the physical layer/radio interface) when configuring radio communications between the network with a terminal device, it has been recognised how it may also be useful to take account of application information for the terminal device (i.e. information relating to operating characteristics associated with the terminal device which are relevant for higher layers).

For example, the 3GPP document R2-165582 "UE context awareness to optimize the RAN performance", 3GPP TSG-RAN WG2 Meeting #95, Gothenburg, Sweden 22-26 Aug. 2016 [1] discusses proposals relating to how a network might take account of terminal device context awareness (i.e. application information).

In order to allow a wireless telecommunications system to take account of terminal device application context information when determining how to support communications with the terminal device in an efficient manner, there is a need for methods and apparatus that allow for such application information to be efficiently communicated from the terminal device to the network.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
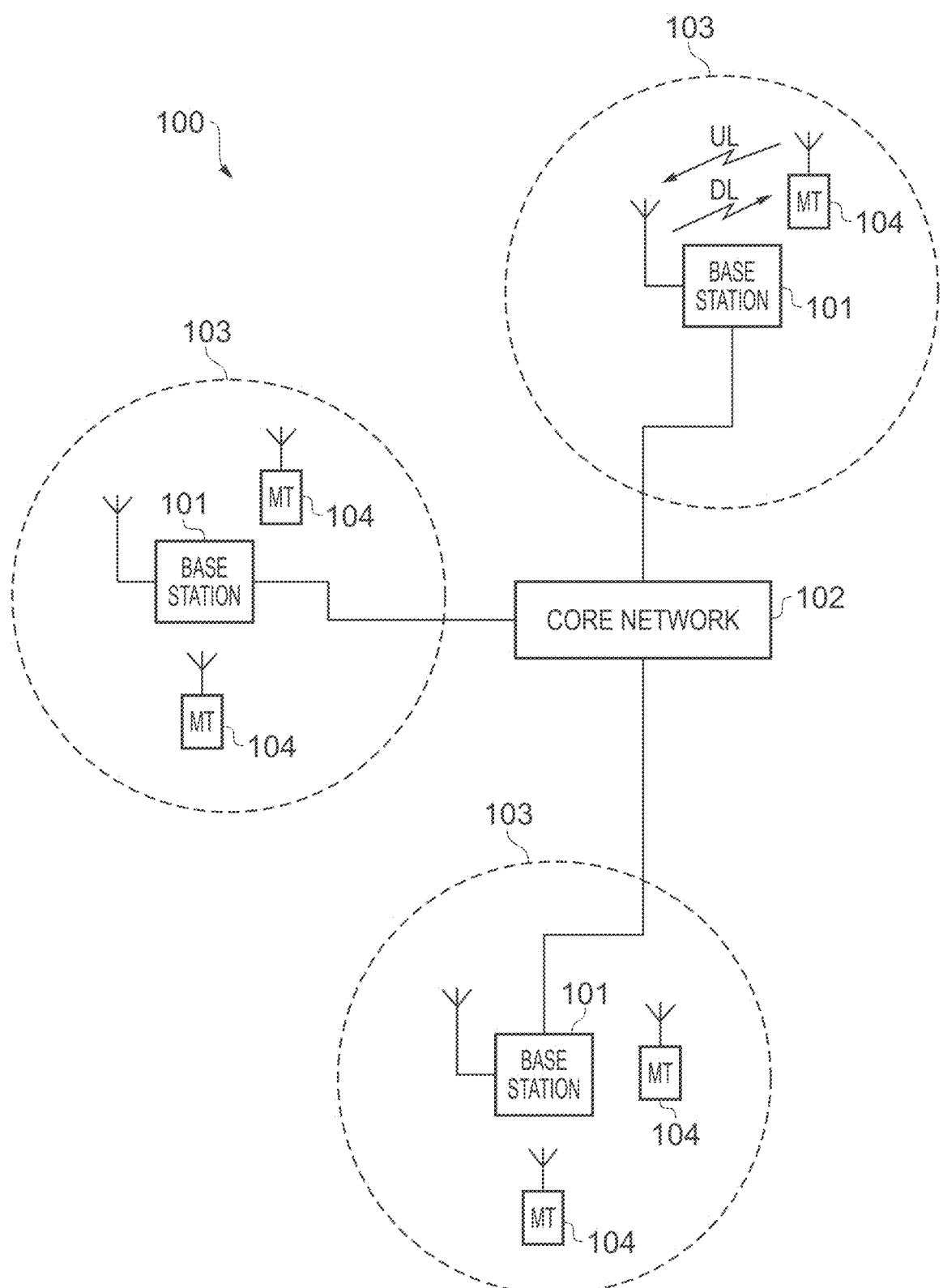
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
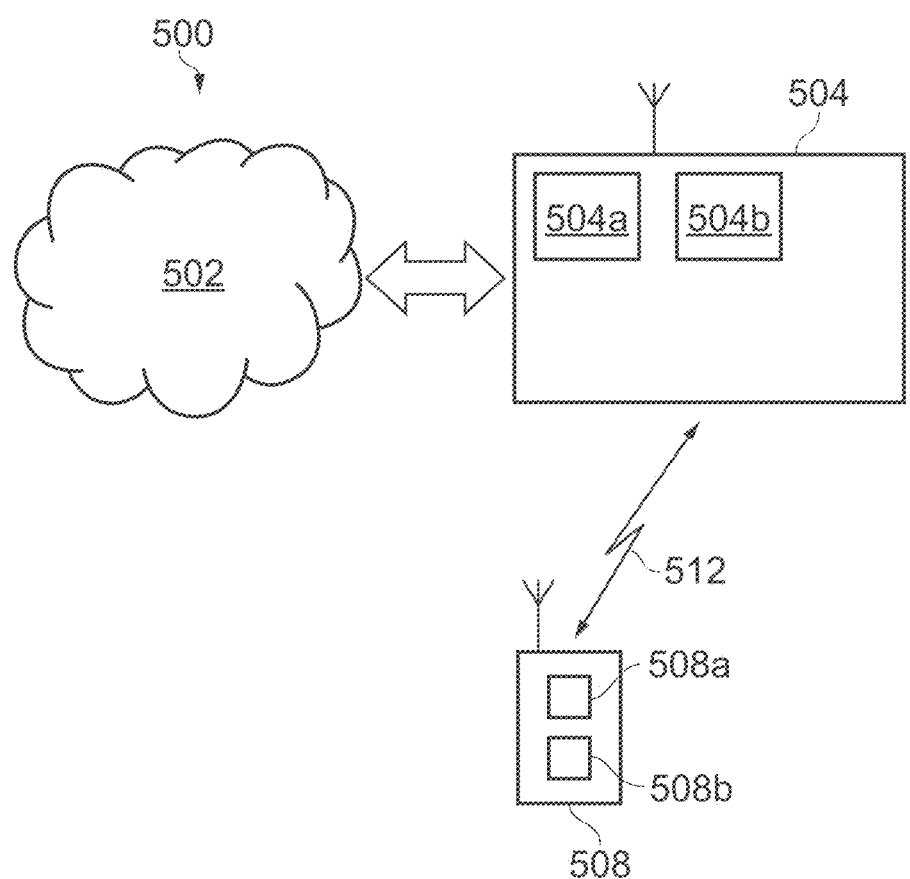
FIG. 2 schematically represents some aspects of a wireless telecommunications network configured to operate in accordance with certain embodiments of the present disclosure.

FIG. 2 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 2 with appropriately configured functionality or separate hardware configured to operate in association with the hardware represented in FIG. 2. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 2. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 2 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 2 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry chip (s)/chipset(s). It will be appreciated the terminal device 508 will in general comprise various other elements associated with its operating functionality, for example a power source, user interface, and so forth, but these are not shown in FIG. 2 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the 2.0 processor circuitry 504b are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 2 for simplicity, the processor circuitry 504b may comprise scheduling circuitry, that is to say the processor circuitry 504b may be configured/programmed to provide the scheduling function for the base station 504.

Thus, the base station 504 is configured to communicate data with the terminal device 508 over a radio communication link 512 using the principles described herein.

As noted above, it has been proposed to provide networks with application information relating to terminal devices, and in accordance with certain embodiments of the disclosure the application information is communicated from the terminal device to the network in association with during a radio resource control, RRC, connection procedure, i.e. when transitioning to an RRC connected state, and in particular in relation to message requesting an RRC connection to a cell (e.g. a cell supported by the base station) of the network.

As is well understood, in wireless telecommunications networks there are different Radio Resource Control (RRC) modes for terminal devices. For example, it is common to support an RRC idle mode (RRC_IDLE); and an RRC connected mode (RRC_CONNECTED). The specific state terminology RRC_IDLE and RRC_CONNECTED is used in LTE-based systems, but it will be appreciated similar and corresponding states exist in other wireless telecommunications networks operating in accordance with other radio access technologies, such as UTRAN, GERAN, WLAN or a 5G new RAT (NR) networks.

Generally speaking, in RRC connected mode a terminal device is connected to a cell/base station (radio transceiver station) in the sense of being able to receive user plane data on that cell (either directly or via an intermediate node, such as a relay) and in RRC idle mode the terminal device is not connected to a cell/base station (radio transceiver station) in the sense of not being able to receive user plane data on that cell. In idle mode the terminal device may still receive some communications from base stations, for example reference signalling for cell reselection purposes and other broadcast signalling. For the RRC idle mode, the core network (ON) part of the wireless telecommunications system recognizes the terminal device is present within the network, but the radio access network (RAN) part of the wireless telecommunications system (i.e. comprising the base stations) does not. Thus, in broad summary, in RRC idle mode the terminal device is not connected to a cell, whereas in RRC connected mode the terminal device is connected/attached to a cell. The RRC connection setup procedure of going from RRC idle mode to RRC connected mode may be referred to as connecting to a cell/base station. Thus when a terminal device operating in an RRC idle mode wishes to transition to an RRC connected mode to exchange data with the network, it transmits an RRC connection request message to the currently selected base station to initiate an RRC connection procedure in accordance with well-established techniques.

One characteristic of the RRC connected mode is the association of one or more dedicated logical channels with the terminal device to allow the terminal device to exchange data with the cell to which it is connected. A terminal device in a conventional RRC idle mode will not be associated with this kind of dedicated logical communication channel.

Figure 3:
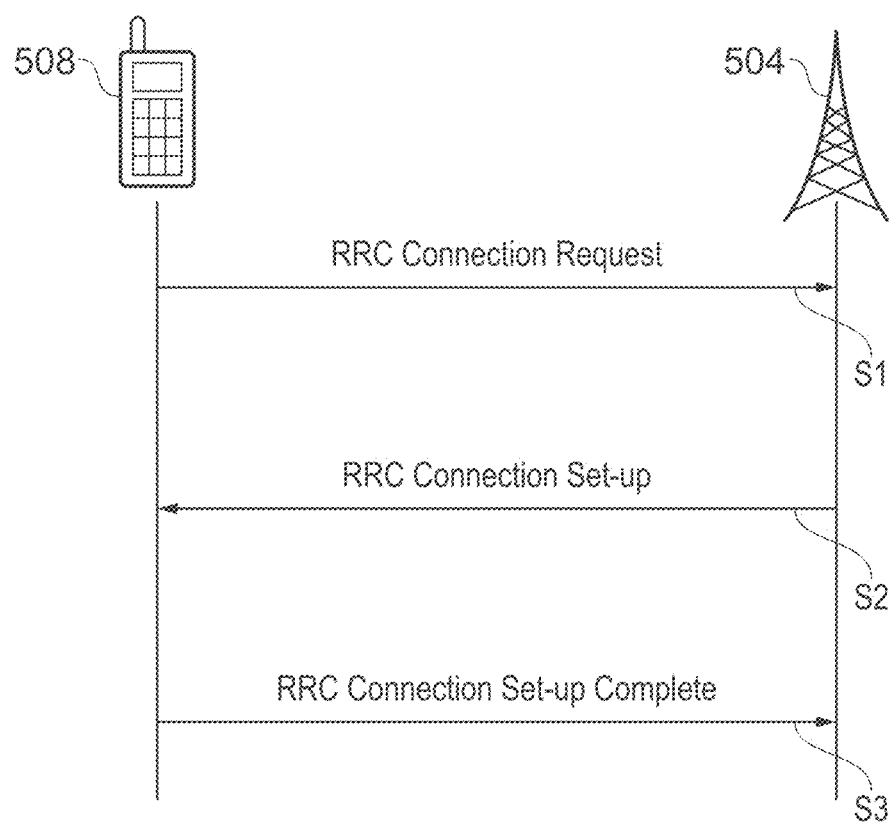
FIG. 3 schematically represents an RRC connection procedure that may be modified in accordance with embodiments of the disclosure.

FIG. 3 is a ladder diagram schematically representing signalling message exchange between the terminal device 508 and the base station 504 represented in FIG. 2 during an RRC connection establishment procedure which may be adapted to incorporate approaches in accordance with some embodiments of the disclosure as discussed further below. Signalling is transmitted and received by the terminal device 508 using its transceiver circuitry 508a operating under control of its processor circuitry 508b and signalling is transmitted and received by the base station 504 using its transceiver circuitry 504a operating under control of its processor circuitry 504b.

In step S1 the terminal device 508 transmits an RRC connection request message to the base station 504. This is transmitted by the terminal device in response to the terminal device 508 determining it should seek to establish an RRC connection to the base station. There are a number of reasons why the terminal device may determine that it should seek to establish an RCC connection to the base station, for example a user of the terminal device may be placing a voice call, an application running on the terminal device may need to access a remote application server, for example to obtain data associated with the running of the application, or the terminal device may be responding to a paging message, for example because another party is trying to place a voice call to the terminal device.

In an LTE-context, the RRC connection request message of step S1 is sent as part of a random access procedure (it corresponds with Message 3 in an LTE RACH procedure). Conventionally the RRC connection request message includes an indication of an identifier for the terminal device and an indication of an establishment cause for the RRC connection request. In LTE there is no scope for communicating additional data in the RRC connection request as it is currently configured (this may, in principle, be changed in a later release), but there will be scope for doing this in corresponding signalling in other cases, for example an RRC connection request message in UMTS may also include channel measurement report information to facilitate downlink power control.

In step S2 the base station 504 transmits an RRC connection set-up message to the terminal device 504 in response to having received the RRC connection request message of step S1. The RRC connection set-up message of step 32 may include information for the terminal device to use to access the network, for example, in LTE the RRC connection set-up message may include configuration information for the down link shared physical channel and the uplink shared and control physical channels. It may also include information relating to uplink power control, channel quality indicator (CQI) reporting, sounding reference signals (SRS), antenna configuration and scheduling requests.

On receiving the RRC connection set-up of step S2, the terminal device 508 transitions to RRC connected mode and completes the RRC connection procedure by transmitting an RRC connection set up complete message to the base station 504, as indicated in FIG. 3 in step 3. The RRC connection set-up complete message of step S3 may include various data, for example a transaction identifier, a selected PLMN identity, information relating to registration of the terminal in an MME, an initial NAS message (e.g. regarding attach, detach, tracking area update, service request or extended service request).

The processing schematically represented in FIG. 3 aligns with that used in an LTE-based network, but a similar approach is used in other wireless telecommunication schemes, and can be expected to be adopted in new radio access technology schemes. That is to say, although the specific protocols and message contents discussed above are in particular related to LTE-based implementations, networks operating in accordance with other wireless access technologies also rely on a terminal device sending a request to establish radio resource control connection when the terminal device wishes to attach/connect to a cell.

Following the RRC connection procedure, the terminal device is attached/connected to a cell of the network and is able to exchange user plane data with the network over the radio access interface supported by the cell. As noted above, it has been recognized that a network may be able to more efficiently handle communications with a terminal device if the network is provided with application information relating to the terminal device. In particular, the inventors have recognised how this kind of terminal device operating context/application information may help a network determine which radio access technology is most appropriate to use for supporting a terminal device that is seeking to connect to the network through a cell.

Some previously proposed examples of application information relating to the operating context; status and type of terminal device that might be useful for helping a network determine how best to handle communications with a terminal device, and how this information might be used, are set out in the following two tables taken from the 3GPP document R2-165582 "UE context awareness to optimize the RAN performance", 3GPP TSG-RAN WG2 Meeting #95, Gothenburg, Sweden 22-26 Aug. 2016 [1]:

TABLE 1

Example of possible context descriptors (application information):

| CONTEXT DESCRIPTORS/ PARAMETERS | DESCRIPTORS/ PARAMETER DETAIL | SENSOR/ CONTEXT TYPE |
|---|---|---|
| Location | Geographical coordinates + uncertainty | GPS, RAT sensing, gyroscope, pedometer etc |
| Mobility type | Static, pedestrian, driving, non-driver in vehicle, train | Gyroscope, data mining (appointment information) |
| Location and mobility prediction (route map) | Schedule of geographical coordinates and associated mobility type vs time | Data mining (calendar, stored routine for day/time) |
| User relationship | Current user relationship to phone (e.g. currently interacting, not interacting, phone carried by user, phone close to user, phone not in proximity of the user) | Device activity plus physical environment sensing |
| Device power status | Battery level, charging status, discharging rate | Device context information |
| Connectivity status | Cellular data on/off WiFi, BT on/off Actual internet connectivity on/off | Device context information |

TABLE 2

Examples of possible network enhancement use cases:

| USE CASE | CONTEXT DESCRIPTORS/ PARAMETERS | DESCRIPTION |
|---|---|---|
| Mobility management E.g., HO decision with multiple possible targets | Mobility Type Location and mobility prediction | Handover decision (small cells vs large cells). |
| User relationship based congestion control | Location Mobility type Location and mobility prediction User relationship | There are multiple actions that the eNB can take when faced with congestion e.g. RRC connection rejection, selective dropping of packets, bearers or UEs. To select UEs/bearers for these actions, the eNB can take into account the available parameters, but these may provide low granularity. In this case, the eNB takes into account whether the user is involved in the current activity, and also whether it is likely that the UE will stay in the same area (i.e. the situation will not improve). A high level of user interaction could disqualify the associated bearers from being impacted by congestion |
| Inter-frequency and inter-RAT Load management | Location Mobility type Location and mobility prediction | For load management actions, the eNB can select specific UEs that may be better served by other frequencies or other RATs. In the inter-frequency case, mobility type and location can be used if for example the other frequencies have smaller or larger coverage areas. Inter-RAT handovers could be applied to mobility UEs. Note that these actions can be pre-emptively carried out upon connection establishment if the context is provided by the UE. |
| Traffic offload | Mobility type Location and mobility prediction | If device has current WiFi connectivity, and is expected to be static, may consider WiFi offload option (or LIPA/SIPTO under similar conditions but no WiFi connectivity) even if the cellular coverage is good. |
| Dual connectivity or carrier aggretion | Device power status | If device has low power and is not being charged, may consider not using CA |
| DRX setting | User relationship Device power status | Relaxed DRX settings may be used if the phone is not in the proximity of the user (particularly if power is low), on the basis that it is less likely that the user would respond (so initial delay is not critical). |

TABLE 2-continued

Examples of possible network enhancement use cases:

| USE CASE | CONTEXT DESCRIPTORS/ PARAMETERS | DESCRIPTION |
|---|---|---|
| Mobility on demand | Location<br>Mobility Type<br>Location and mobility prediction<br>User relationship<br>Likelihood of user interaction<br>Device power status | Measurement configuration could be rather relaxed for UE given as static, and also for those not in proximity of the user, or where the user is not likely to use the phone. This could be particularly useful for static UEs in cell edge areas, to avoid excessive number of measurements and ping-pong handovers. |

The first table (Table 1) sets out some example types of application information (CONTEXT DESCRIPTORS PARAMETERS), example of what information might be included for each type (DESCRIPTORS/PARAMETER DETAIL), and examples of how the information may be obtained by the terminal device (SENSOR/CONTEXT TYPE).

The second table (Table 2) sets out some aspects of network operation that may be enhanced by taking account of application information (USE CASE), examples of the types of application information that may be useful in each case (CONTEXT DESCRIPTORS/PARAMETERS), and some further details for each (DESCRIPTION).

Figure 4:
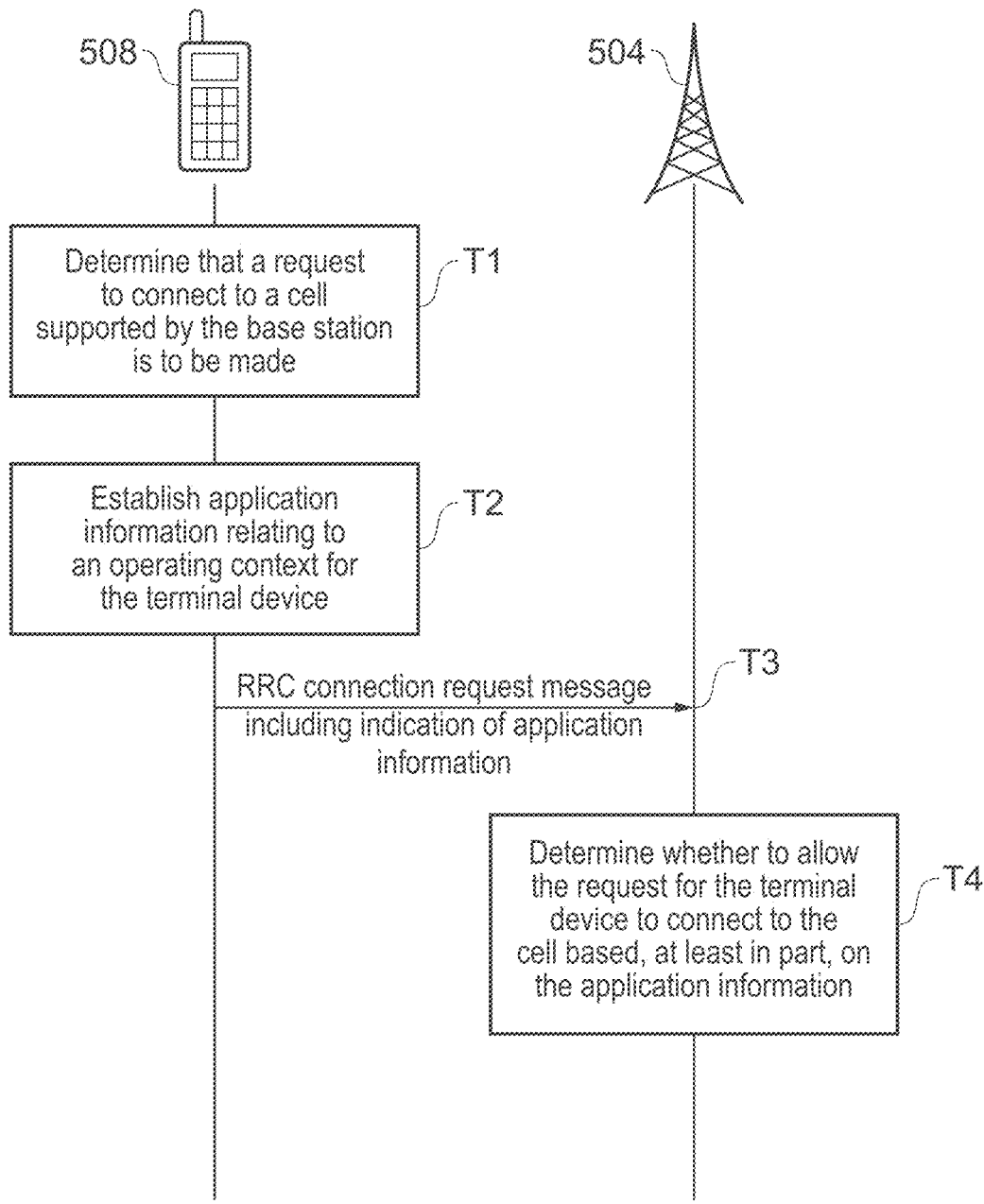
FIG. 4 is a signalling ladder diagram representing some aspects of operation in a wireless telecommunications system in accordance with certain embodiments of the present disclosure.

FIG. 4 is a ladder diagram schematically representing signalling message exchange between, and steps performed by, the terminal device 508 and the base station 504 represented in FIG. 2 in accordance with an embodiment of the disclosure. The processing represented in FIG. 4 provides a method of controlling a connection procedure for the terminal device 508 requesting a radio connection to a cell supported by the base station 504 (or more generally network infrastructure equipment 504) in the wireless telecommunication system 500. Signalling is transmitted and received by the terminal device 508 using its transceiver circuitry 508a operating under control of its processor circuitry 508b and signalling is transmitted and received by the base station 504 using its transceiver circuitry 504a operating under control of its processor circuitry 504b. The operational steps represented in FIG. 4 which are performed by the terminal device 508 are performed using the terminal device's processor circuitry 508b and the operational steps represented in FIG. 4 which are performed by the base station 504 are performed using the base station's processor circuitry 504b.

In step T1 the terminal device determines that it should initiate a request to connect to a cell supported by the base station (i.e. request a connection to the network). As discussed above with relation to FIG. 3, there are various reasons why the terminal device may decide that it should seek to connect to the network. For example, a user of the terminal device may be placing a voice call, an application running on the terminal device may need to access a remote application server, for example to obtain data associated with the running of the application, or the terminal device may be responding to a paging message, for example because another party is trying to place a voice call to the terminal device.

In step T2 the terminal device establishes application information relating to its current operating context that the terminal device will convey to the base station to help the base station determine how best to handle the terminal device in the wireless telecommunications system, for example whether or not to allow the terminal device to connect to a cell supported by the base station. As explained further below, there are various kinds and types of application information that may be useful in this regard, and the specific application information determined by a particular terminal device in a given situation will depend on the application at hand.

In step T3 of the processing represented in FIG. 4, the terminal device transmits an RRC connection request message to the base station (network infrastructure equipment) to request a radio connection to the cell supported by the base station. This connection request message corresponds with that discussed above in relation to step S1 of FIG. 3. However, in accordance with embodiments of the disclosure, in addition to comprising a request for the terminal device to connect to the cell supported by the base station, the connection request message of step T3 further includes an indication of the application information established by the terminal device in step T2 which the base station may use in determining how to handle the request (i.e. whether to allow all refused the request). It will be appreciated that in certain embodiments the terminal device may also be configured to communicate capability information in addition to the application information in the connection request message step T3. For example the terminal device may include capability information relating to the terminal device's ability to access a radio interface in this message, e.g. to indicate the radio access technologies and/or frequency bands the terminal device supports. This can also help the network infrastructure equipment (e.g. base station) decide whether to allow the connection request or redirect the terminal device to a different frequency or cell supported by the terminal device, e.g. for load balancing.

In step T4 the base station determines whether or not to allow the request for the terminal device to connect to the base station in a way that takes account of the application information established by the terminal device in step T2 and communicated to the base station in step T3 in association with the RRC connection request message. There are various ways in which the base station can take account of the application information received from the terminal device when determining how to handle the connection request message from the terminal device and the specific manner in which this is done in a given implementation will depend both on the nature of the application information received and the manner in which the network operator has configured the network to take account of this information.

If it is determined in step T4 that the application information provided by the terminal device indicates it would be appropriate to support the terminal device on the cell to which it has requested connection, the base station may decide to allow the request for the terminal device to connect to the cell supported by the base station, and proceed accordingly, for example by sending an RRC connection setup message back to the terminal device along the lines discussed above in relation to step S2 of FIG. 3.

However, if it is determined in step T4 that the application information provided by the terminal device indicates it would not be appropriate to support the terminal device on the cell to which it has requested connection, for example because the application/device context information provided by the terminal device indicates the device is seeking to run a video streaming application but the cell on which the terminal device has requested connection is configured to support low data throughput devices, the base station may decide to reject the request for the terminal device to connect to the cell supported by the base station. Furthermore, the base station may, in some cases provide the terminal device with an indication of a different cell to which it should instead seek to connect (i.e. the network infrastructure equipment may redirect the terminal device to a different cell, for example a cell that supports higher data rates).

In this regard, it will be appreciated that the term cell is used in this context to refer to any logical entity responsible for managing a set of radio resources in a wireless communications system, and may include, for example, a conventional LTE base station, a network slice supported in a wireless communication system, a WLAN wireless access point, or a wireless access point associated with any other radio access technology, for example including 5G/new RAT technologies. Thus, a "cell", as the term is used in this context, may also be referred to as, for example, a wireless carrier, a wireless network access point, a wireless transceiver station, a wireless network interface, a transmission/reception point, and so on. A cell may in some respects be considered to represent network infrastructure elements supporting wireless telecommunications which are uniquely identifiable (e.g. by being associated with a cell identifier).

It will be appreciated the processing of FIG. 4 represents merely one particular example of an approach in accordance with certain embodiments of the disclosure and this processing may be modified in other examples. For example, the order of the steps T1 and T2 may be reversed. That is to say, the terminal device may not necessarily establish the relevant application information (step T2 in FIG. 4) following or in response to determining that a request to connect to the network is to be made (step T1 in FIG. 4). Rather, in some implementations the terminal device may maintain a record of relevant application information on an on-going basis, for example updated in accordance with a predetermined schedule, so that it can simply refer to the already-established record of the relevant application information when it is desired to transmit an indication of the application information to the network in association with an RRC connection request message (step T3 in FIG. 4) in accordance with any embodiment of the disclosure.

As noted above, there are various different types of application information that a terminal device may convey to network infrastructure equipment to which it seeks to connect and how the network infrastructure equipment may base a decision to allow or reject a connection request on the basis of this information in accordance with different implementations of embodiments of the disclosure. Some examples of different types of application information and how a network might take this into account when deciding whether to allow a request to connect to a cell or whether to redirect a terminal device to a different cell are as follows.

In some examples the application information might comprise an indication of a battery status for the terminal device. For example, if the terminal device indicates that it has a low battery level, and the cell to which the terminal device is seeking to connect supports power-intensive communications (e.g. using beamforming), the base station may decide to reject the connection request and redirect the terminal device to a cell associated with lower-power communications.

In some examples the application information might comprise an indication of a measurement of radio conditions or a radio coverage mode for the terminal device. For example, if the terminal device indicates that it is in good radio coverage and is seeking to connect to a cell which supports high levels of redundancy/data repetition to optimise key locations with terminal devices in poor coverage areas, the base station may decide to reject the connection request and redirect the terminal device to a cell that is not optimised for poor coverage devices.

In some examples the application information might comprise an indication of a software application type or software source running on the terminal device. For example, if the terminal device indicates that it is seeking to connect to the cell to receive data for a video streaming application, but the cell to which the terminal device is seeking to connect its optimised to support machine type communications (e.g. sporadic transmission of small amounts of data), the base station may decide to reject the connection request and to redirect the terminal device to a cell associated with higher data rates.

In some examples the application information might comprise an indication of an Internet Protocol characteristic for the terminal device. For example, application information may include an indication of a service continuity mode for the terminal device. Thus, if a terminal device indicates an association with a particular service continuity mode, e.g. SSC 2 in 3GPP, this could be taken to indicate the terminal device requires nomadic mobility, and so the network and decide whether to accept or reject the request based on whether the cell to which the terminal device is seeking to connect supports nomadic mobility.

In some examples the application information might comprise an indication of a preferred network slice for the terminal device. For example, the terminal device may indicate that it is an mMTC device (i.e. a device of which there are massive numbers in the network) and a cell to which the terminal device seeks to connect may decide whether to accept or reject the connection based on whether the cell is associated with a network slice that supports mMTC devices. As will be appreciated, network slicing may be used to provide virtually separated software defined networks optimised for specific application requirements in a mobile network operator (MNO) core network. For example, a UE/application requiring URLLC (Ultra Reliable Low Latency) support may be directed to connect to one slice network which meets low latency requirements, while an mMTC UE/application might be directed to connect to a different slice network which is more suited to officially support delay-tolerant requirement is. Further details are network slicing can be found at https://www.ericsson.com/res/docs/whitepapers/what-is-a-5g-system.pdf [3], for example.

In some examples the application information might comprise an indication of a form factor for the terminal device. For example, the terminal device may indicate that it is a wearable device, and the network may determine this should be supported on a cell appropriate for devices with relatively low battery and transmission powers, and which are relatively mobile. Depending on whether the cell which the terminal device is seeking to request meets these criteria, the network infrastructure equipment can decide whether to allow or reject the connection request.

In some examples the application information might comprise an indication of a degree of mobility for the terminal device. For example, if a terminal device transmits application information indicating that it has high mobility, or s expected to have high mobility during the period of connection, the network infrastructure equipment may determine whether or not the cell which the terminal device is seeking to connect is well-suited to support high mobility. For example, if the cell is a Wireless LAN, the network infrastructure equipment may determine the terminal device should be rejected from connecting to this cell, and should instead connect to and LTE-based network having greater support for mobility over larger geographic scales.

In addition to determining whether or not to accept a connection request, it will be appreciated the application information provided by the terminal device in association with a connection request message may be used to configure aspects of communications with the terminal device when it is accepted for connection to the cell. For example, if the terminal device indicates that it has high battery power remaining, the network infrastructure equipment may allow the terminal device to connect to the cell and configure it for carrier aggregation operation, but if the terminal device indicates that it has low battery power remaining, the network infrastructure equipment may nonetheless allow the terminal device to connect to the cell, but may not configure it for carrier aggregation operation to help preserve battery power at the terminal device.

When the network infrastructure equipment decides a request to connect to a particular cell should be rejected and the terminal device should instead be redirected to a different cell, it will be appreciated the different cell may be operating in accordance with the same radio access technology as the cell to which the terminal device initially tried to connect, or may be a cell operating in accordance with a different radio access technology. Furthermore, it will be appreciated the different cells may be supported by the same or different network infrastructure equipment. For example, the different cells may correspond with different network slices or different virtual carriers supported by a single network infrastructure equipment element (e.g. a single radio transceiver station).

Some further examples of how approaches in accordance with embodiments of the disclosure for conveying terminal device operating context application information to network infrastructure equipment in association with a radio resource control connection request message are as follows.

1. The network may prioritize one frequency (cell) over another depending on terminal device capability and based on cell specific deployment configurations in the network, for example whereby eMBB (enhanced mobile broadband) is supported on one frequency and mMTC on another in LTE or NR RAT.

2. While some application information may be provided in association with an RRC connection request, additional information may be supplied later in the connection procedure or after connection. E.g. another set of capabilities/application information may be reported after RRC connection is complete and the network may ask for further capability/application information, for example concerning CA capabilities, measurement capabilities, feature related capabilities, as and when the need arises. This can help by avoiding the need to send all information at the same time when some of the information will not be needed.

3. Based on application type, a terminal device may select appropriate capabilities like support of NB-IOT/eMTC if application is mMTC, to report. That is to say, a terminal device may determine from its own characteristics/operating context, what application information is appropriate to convey to the network in association with a connection request, for example an indication of radio access technology types supported and coverage mode required (e.g. if the terminal device indicates it is currently operating in a poor coverage area it may be redirected to a cell that provide better support for internal advisers import coverage areas, for example a cell providing higher transmission repetitions).

4. In some example implementations a network element may broadcast a set of different terminal device application information categories that may exist in the network, and the terminal device can identify which category matches (or best matches) its current application state, and communicate an indication of this category with a connection request. This approach can help reduce the amount of information being communicated to indication the relevant application information from the terminal device to the network in a connection request. In a variation of this approach, the terminal device might not specifically provide the network with an indication of its selected category, but may instead rely on information broadcast by the network to select an appropriate cell to which to connect for calling to its category.

5. UE can indicate power preference if it is in power limited state and network may configure long DRX or assume that UE may experience delay in signaling. For example, a terminal device may indicate in association with its connection request that it is a type of device that should be supported in a low-power mode (e.g. because it is required to operate on battery power for an extended period), in which case the network infrastructure equipment/base station may decide to redirect the terminal device to another cell that supports low-power mode operation, for example through extended DRX periods.

6. Based on application type, NW may configure SRB based data transmission e.g. for mMTC. For example, if a terminal device communicates application information indicating it is an mMTC type of device, an action on the network side may be to configure the network in such a way that the terminal device can send small amounts of data over SRB (signalling radio bearer) in the manner proposed for mMTC devices in 3GPP Release 13.

7. Early indication in RRC Connection Request about network slice to be used by the UE may give enough time for network to prepare the slice capacity. For example, if the network is provided with an early indication of an appropriate network slice for the terminal device, the network may have sufficient time to reconfigure resources to provide increased force on the relevant slice.

Thus there has been described a method for controlling a connection procedure for a terminal device requesting a radio connection to a cell supported by network infrastructure equipment in a wireless telecommunication system, the method comprising: determining, at the terminal device, that a request to connect to the cell supported by the network infrastructure equipment is to be made, establishing, at the terminal device, application information relating to an operating context for the terminal device; transmitting a connection request message from the terminal device to the network infrastructure equipment, wherein the connection request message comprises a request for the terminal device to connect to the cell and an indication of the application information; and determining, at the network infrastructure equipment, whether to allow the request for the terminal device to connect to the cell based, at least in part, on the application information received by the network infrastructure equipment from the terminal device.

Significantly, and in accordance with certain embodiments of the disclosure, a terminal device seeking to connect to a communication cell is configured to provide the communication cell with an indication of application information (e.g. information relating to an operating context of the terminal device as opposed to information relating to its radio hardware/modem capabilities) in association with an RRC connection request message. This can allow the network infrastructure equipment supporting the cell to which the terminal device is seeking to connect to quickly determine if it is appropriate to allow the terminal device to connect to the cell, or whether the terminal device should be redirected to another cell. It will be appreciated these principles can be applied in respect of any new bearer setup or RRC state transition to RRC connected. That is to say, in addition to covering situations in which a terminal device transitions from IRC idle to RRC connected, the same principles may be used in networks supporting other RRC states, such as RRC inactive and RRC suspend, when a terminal device transitions from one of the states to RRC connected.

While certain example embodiments have been described in relation to particular example network architectures, it will be appreciated the same principles can be applied in respect of other network architectures, for example non-LTE based networks.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for controlling a connection procedure for a terminal device requesting a radio connection to a cell supported by network infrastructure equipment in a wireless telecommunication system, the method comprising: determining, at the terminal device, that a request to connect to the cell supported by the network infrastructure equipment is to be made, establishing, at the terminal device, application information relating to an operating context for the terminal device; transmitting a connection request message from the terminal device to the network infrastructure equipment, wherein the connection request message comprises a request for the terminal device to connect to the cell and an indication of the application information; and determining, at the network infrastructure equipment, whether to allow the request for the terminal device to connect to the cell based, at least in part, on the application information received by the network infrastructure equipment from the terminal device.

Paragraph 2. The method of paragraph 1, wherein in the event the network infrastructure equipment determines it should allow the request for the terminal device to connect to the cell, the network infrastructure equipment transmits a connection set-up message to the terminal device, wherein the connection set-up message comprises configuration information for the cell to be used by the terminal device for accessing the cell.

Paragraph 3. The method of paragraph 2, further comprising the network infrastructure equipment supporting communications with the terminal device when it has connected to the cell in a manner that is based, at least in part, on the application information received by the network infrastructure equipment from the terminal device.

Paragraph 4. The method of any of paragraphs 1 to 3, wherein in the event the network infrastructure equipment determines it should not allow the request for the terminal device to connect to the cell based on the application information, the network infrastructure equipment transmits to the terminal device an indication that the terminal device should instead request a connection to a different cell supported in the wireless telecommunication system.

Paragraph 5. The method of paragraph 4, wherein the cell and the different cell are supported by the same network infrastructure equipment.

Paragraph 6. The method of paragraph 4, wherein the cell and the different cell are supported by different network infrastructure equipment.

Paragraph 7. The method of any of paragraphs 4 to 6, wherein the cell and the different cell operate in accordance with different radio access technologies.

Paragraph 8. The method of any of paragraphs 4 to 6, wherein the cell and the different cell operate in accordance with the same radio access technologies.

Paragraph 9. The method of any of paragraphs 4 to 8, wherein the cell and the different cell correspond with different network slices.

Paragraph 10. The method of any of paragraphs 1 to 9, wherein the application information relating to an operating context for the terminal device comprises one or more of: an indication of a status of a battery for the terminal device; an indication of a measurement of radio conditions for the terminal device; an indication of a radio coverage mode for the terminal device; an indication of a software application type running on the terminal device; an indication of a software application source for the terminal device; an indication of an Internet Protocol characteristic for the terminal device; an indication of a preferred network slice for the terminal device; an indication of a form factor for the terminal device; and an indication of a degree of mobility for the terminal device.

Paragraph 11. The method of any of paragraphs 1 to 10, wherein the step of establishing, at the terminal device, application information relating to an operating context for the terminal device for which an indication is subsequently transmitted to the base station comprises the terminal device selecting what kind of application information to indicate to the network based on information previously received from the network.

Paragraph 12. The method of any of paragraphs 1 to 11, wherein the connection request message further comprises an indication of capability information for the terminal device, wherein the capability information relates to the terminal device's ability to access a radio interface, for example, what radio access technologies and/or frequencies/bands the terminal device supports.

Paragraph 13. A method of operating a terminal device in a wireless telecommunications system, the method comprising: determining that a request to connect to a cell supported by network infrastructure equipment in the wireless telecommunications system is to be made, establishing application information relating to an operating context for the terminal device; and transmitting a connection request message to the network infrastructure equipment, wherein the connection request message comprises a request for the terminal device to connect to the cell and an indication of the application information.

Paragraph 14. A terminal device for use in a wireless telecommunications system, wherein the terminal device comprises controller circuitry and transceiver circuitry configured to operate together such that the terminal device is operable to: determine that a request to connect to a cell supported by network infrastructure equipment in the wireless telecommunications system is to be made, establish application information relating to an operating context for the terminal device; and transmit a connection request message to the network infrastructure equipment, wherein the connection request message comprises a request for the terminal device to connect to the cell and an indication of the application information.

Paragraph 15 Circuitry for a terminal device for use in a wireless telecommunications system, wherein the circuitry comprises controller circuitry and transceiver circuitry configured to operate together such that the circuitry is operable to: determine that a request to connect to a cell supported by network infrastructure equipment in the wireless telecommunications system is to be made, establish application information relating to an operating context for the terminal device; and transmit a connection request message to the network infrastructure equipment, wherein the connection request message comprises a request for the terminal device to connect to the cell and an indication of the application information.

Paragraph 16. A method of operating network infrastructure equipment supporting a cell in a wireless telecommunications system, the method comprising: receiving a connection request message from a terminal device operating in the wireless telecommunications system, wherein the connection request message comprises a request for the terminal device to connect to the cell and an indication of application information relating to an operating context for the terminal device; and determining whether to allow the request for the terminal device to connect to the cell based, at least in part; on the application information received from the terminal device.

Paragraph 17. Network infrastructure equipment supporting a cell in a wireless telecommunications system; wherein the network infrastructure equipment comprises controller circuitry and transceiver circuitry configured to operate together such that the network infrastructure equipment is operable to: receive a connection request message from a terminal device operating in the wireless telecommunications system; wherein the connection request message comprises a request for the terminal device to connect to the cell and an indication of application information relating to an operating context for the terminal device; and determine whether to allow the request for the terminal device to connect to the cell based, at least in part, on the application information received from the terminal device.

Paragraph 18. Circuitry for network infrastructure equipment supporting a cell in a wireless telecommunications system, wherein the circuitry comprises controller circuitry and transceiver circuitry configured to operate together such that the circuitry is operable to: receive a connection request message from a terminal device operating in the wireless telecommunications system, wherein the connection request message comprises a request for the terminal device to connect to the cell and an indication of application information relating to an operating context for the terminal device; and determine whether to allow the request for the terminal device to connect to the cell based, at least in part, on the application information received from the terminal device.

Paragraph 19. A wireless telecommunications system comprising the terminal device of paragraph 14 and the network infrastructure equipment of paragraph 17.

REFERENCES

[1] 3GPP document R2-165582 "UE context awareness to optimize the RAN performance", Qualcomm Incorporated, 3GPP TSG-RAN WG2 Meeting #95, Gothenburg, Sweden 22-26 Aug. 2016
[2] Holma H. and Toskala A, "LTE for UMTS OFDMA and SC-FDMA based radio access", John Wiley and Sons, 2009
[3] Ericsson White Paper, "5G Systems—Enabling Industry And Society Transformation" {what-is-a-5g-system.pdf}, Uen 284 23-3244, January 2015

What is claimed is:

1. A method for controlling a connection procedure for a terminal device requesting a radio connection to a cell supported by network infrastructure equipment in a wireless telecommunication system, the method comprising:
   determining, at the terminal device, that a request to connect to the cell supported by the network infrastructure equipment is to be made,
   establishing, at the terminal device, application information relating to an operating context for the terminal device;
   transmitting a connection request message from the terminal device to the network infrastructure equipment, wherein the connection request message comprises a request for the terminal device to connect to the cell and an indication of the application information, wherein the terminal device determines from its own operating context what application information to include in the connection request; and
   determining, at the network infrastructure equipment, whether to allow the request for the terminal device to connect to the cell based, at least in part, on the application information received by the network infrastructure equipment from the terminal device.

2. The method of claim I, wherein in the event the network infrastructure equipment determines it should allow the request for the terminal device to connect to the cell, the network infrastructure equipment transmits a connection set-up message to the terminal device, wherein the connection set-up message comprises configuration information for the cell to be used by the terminal device for accessing the cell.

3. The method of claim 2, further comprising the network infrastructure equipment supporting communications with the terminal device when it has connected to the cell in a manner that is based, at least in part, on the application information received by the network infrastructure equipment from the terminal device.

4. The method of claim 1, wherein in the event the network infrastructure equipment determines it should not allow the request for the terminal device to connect to the cell based on the application information, the network infrastructure equipment transmits to the terminal device an indication that the terminal device should instead request a connection to a different cell supported in the wireless telecommunication system.

5. The method of claim 4, wherein the cell and the different cell are supported by the same network infrastructure equipment.

6. The method of claim 4, wherein the cell and the different cell operate in accordance with different radio access technologies.

7. The method of claim 4, wherein the cell and the different cell operate in accordance with the same radio access technologies.

8. The method of claim 7, wherein the cell and the different cell correspond with different network slices.

9. The method of claim 4, wherein the cell and the different cell are supported by different network infrastructure equipment.

10. The method of claim 1, wherein the application information relating to an operating context for the terminal device comprises one or more of:
   an indication of a status of a battery for the terminal device;
   an indication of a measurement of radio conditions for the terminal device;
   an indication of a radio coverage mode for the terminal device;
   an indication of a software application type running on the terminal device;
   an indication of a software application source for the terminal device;
   an indication of an Internet Protocol characteristic for the terminal device;
   an indication of a preferred network slice for the terminal device;
   an indication of a form factor for the terminal device; and
   an indication of a degree of mobility for the terminal device.

11. The method of claim 1, wherein the step of establishing, at the terminal device, application information relating to an operating context for the terminal device for which an indication is subsequently transmitted to the base station comprises the terminal device selecting what kind of application information to indicate to the network based on information previously received from the network.

12. The method of claim 1, wherein the connection request message further comprises an indication of capability information for the terminal device, wherein the capability information relates to the terminal device's ability to access a radio interface.

13. A terminal device for use in a wireless telecommunications system, wherein the terminal device comprises controller circuitry and transceiver circuitry configured to operate together such that the terminal device is operable to:
   determine that a request to connect to a cell supported by network infrastructure equipment in the wireless telecommunications system is to be made,
   establish application information relating to an operating context for the terminal device; and
   transmit a connection request message to the network infrastructure equipment, wherein the connection request message comprises a request for the terminal device to connect to the cell and an indication of the application information wherein the terminal device determines from its own operating context what application information to include in the connection request.

14. Network infrastructure equipment supporting a cell in a wireless telecommunications system, wherein the network infrastructure equipment comprises controller circuitry and transceiver circuitry configured to operate together such that the network infrastructure equipment is operable to:
   receive a connection request message from a terminal device operating in the wireless telecommunications system, wherein the connection request message comprises a request for the terminal device to connect to the cell and an indication of application information relating to an operating context for the terminal device, wherein the terminal device determines from its own operating context what application information to include in the connection request; and
   determine whether to allow the request for the terminal device to connect to the cell based, at least in part, on the application information received from the terminal device.

* * * * *